United States Patent
Nair et al.

(10) Patent No.: US 9,213,588 B2
(45) Date of Patent: Dec. 15, 2015

(54) FAULT DETECTION AND IDENTIFICATION IN A MULTI-INITIATOR SYSTEM

(71) Applicant: LSI Corporation, San Jose, CA (US)

(72) Inventors: Naman Nair, Fremont, CA (US); Brad D. Besmer, Colorado Springs, CO (US); Peter C. Rivera, Colorado Springs, CO (US); James Rizzo, Austin, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 14/166,280

(22) Filed: Jan. 28, 2014

(65) Prior Publication Data

US 2015/0199227 A1 Jul. 16, 2015

Related U.S. Application Data

(60) Provisional application No. 61/926,043, filed on Jan. 10, 2014.

(51) Int. Cl.
*G06F 11/00* (2006.01)
*G06F 11/07* (2006.01)

(52) U.S. Cl.
CPC ........ *G06F 11/0745* (2013.01); *G06F 11/0727* (2013.01)

(58) Field of Classification Search
CPC ............ G06F 11/0745; G06F 11/0727; G06F 11/0754; G06F 11/076; G06F 11/0793; H04L 41/0654
See application file for complete search history.

(56) References Cited

U.S. PATENT DOCUMENTS

| | | | |
|---|---|---|---|
| 6,865,689 B1 | 3/2005 | Gibson et al. | |
| 7,536,584 B2* | 5/2009 | Davies et al. | 714/5.11 |
| 7,562,257 B2* | 7/2009 | Takahashi | 714/42 |
| 7,660,893 B2 | 2/2010 | Brillhart et al. | |
| 7,779,308 B2* | 8/2010 | Brown et al. | 714/48 |
| 8,122,298 B2 | 2/2012 | Stenfort | |
| 8,332,560 B2* | 12/2012 | Marks et al. | 710/301 |
| 8,423,665 B2* | 4/2013 | Takeuchi et al. | 709/238 |
| 8,443,237 B2* | 5/2013 | Konishi et al. | 714/43 |
| 8,499,308 B2* | 7/2013 | Stenfort et al. | 719/318 |
| 8,527,815 B2 | 9/2013 | Whitt et al. | |
| 9,037,910 B2* | 5/2015 | Myrah et al. | 714/32 |
| 2005/0228943 A1* | 10/2005 | DeCenzo et al. | 711/114 |
| 2007/0070885 A1 | 3/2007 | Uddenberg et al. | |
| 2008/0228987 A1* | 9/2008 | Yagi et al. | 710/316 |
| 2011/0246833 A1 | 10/2011 | Bockhaus et al. | |
| 2014/0108666 A1* | 4/2014 | Chen et al. | 709/227 |

\* cited by examiner

*Primary Examiner* — Michael Maskulinski
(74) *Attorney, Agent, or Firm* — Suiter Swantz pc llo

(57) ABSTRACT

A storage system and method for identifying a faulty link the storage system is disclosed. The storage system includes a plurality of target devices and at least one expander configured to communicatively couple a plurality of initiators to the plurality of target devices. Each initiator of the plurality of initiators monitors occurrences of link disruptions independently, wherein upon detecting occurrences of a predetermined number of link disruptions within a predetermined time period, a reporting initiator reports a detection of a faulty link in the multi-initiator topology and requests an arbitrator to identify at least one peer initiator in the multi-initiator topology that shares at least one shared link with the reporting initiator. This reporting initiator and its peer initiators then jointly execute a common diagnostic process to identify the faulty link in the multi-initiator topology.

20 Claims, 3 Drawing Sheets

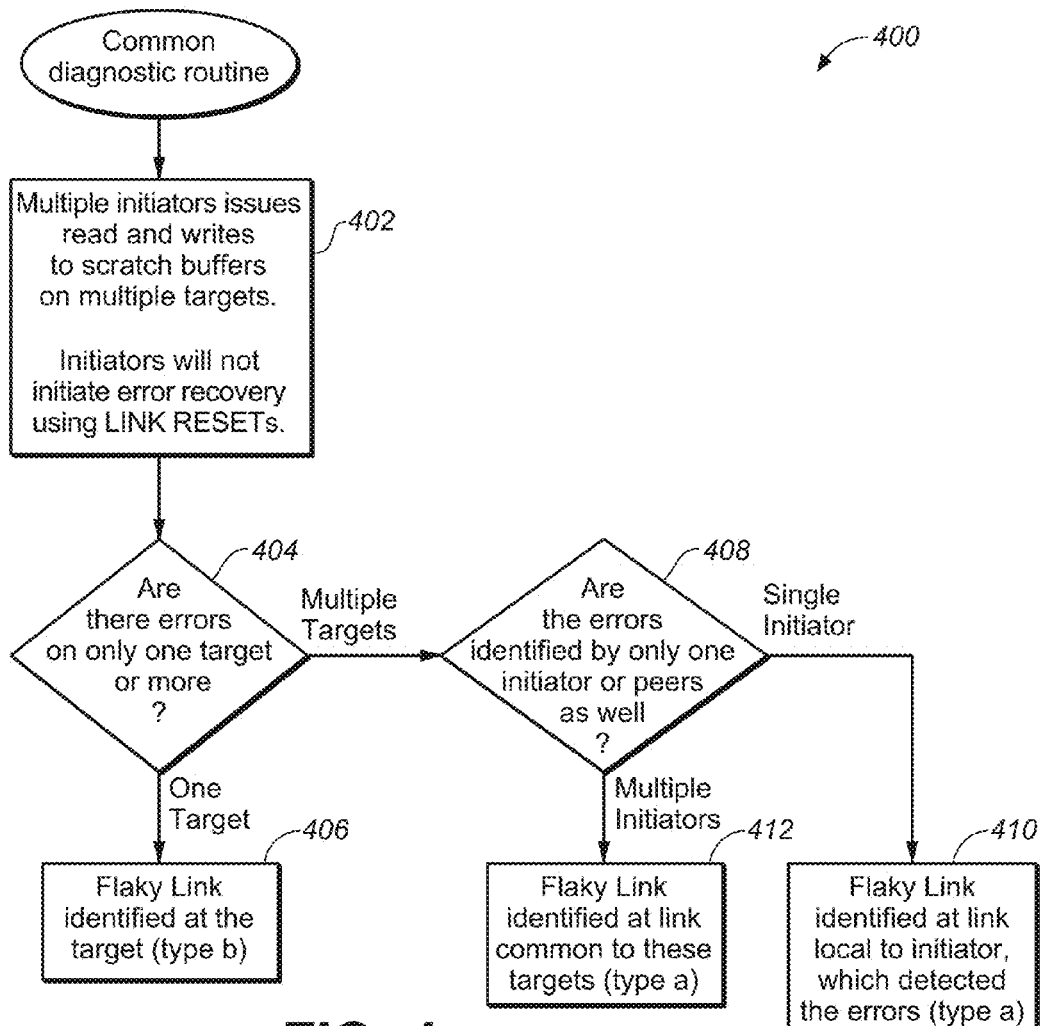

FAULT DETECTION AND IDENTIFICATION IN A MULTI-INITIATOR SYSTEM

CROSS-REFERENCE TO RELATED APPLICATIONS

The present application claims the benefit under 35 U.S.C. §119(e) of U.S. Provisional Application Ser. No. 61/926,043, filed Jan. 10, 2014. Said U.S. Provisional Application Ser. No. 61/926,043 is hereby incorporated by reference in its entirety.

This application is related to co-pending and concurrently filed U.S. patent application Ser. No. 14/166,048, and entitled "Providing Multi-Initiator Serial Advanced Technology Attachment Support in a Multi-Initiator Environment" listing Naman Nair et al. as inventor, the entirety of which is incorporated herein by reference.

TECHNICAL FIELD

The present invention relates to the field of data storage and particularly to a multi-initiator serial attached data storage environment.

BACKGROUND

Serial protocols such as Serial Advanced Technology Attachment (SATA) and Serial Attached Small Computer System Interface (Serial Attached SCSI, or SAS) are commonly used to provide serial communication interfaces to move data to and from computer storage devices such as hard disk drives and the like. For instance, SATA is a computer bus interface that connects host bus adapters to storage devices. SAS, on the other hand, utilizes a point-to-point serial protocol that moves data to and from computer storage devices.

SUMMARY

Accordingly, an embodiment of the present disclosure is directed to a method for identifying a faulty link in a multi-initiator topology. The method includes: reporting a detection of a faulty link by a reporting initiator in the multi-initiator topology; identifying at least one peer initiator in the multi-initiator topology, wherein each of the at least one peer initiator shares at least one shared link with the reporting initiator; and executing a common diagnostic process on each of the at least one peer initiator and the reporting initiator. The common diagnostic process includes the steps of: issuing at least one read request and at least one write request to every target device accessible to each initiator executing the common diagnostic process; determining whether errors occurred on more than one target device; identifying a link associated with a particular target device as the faulty link when errors occurred only on that particular target device; further determining whether errors are identified only by the reporting initiator when errors occurred on more than one target device; identifying a link associated with the reporting initiator as the faulty link when errors are identified only by the reporting initiator; and identifying said at least one shared link as the faulty link when errors are identified by the reporting initiator and the at least one peer initiator.

A further embodiment of the present disclosure is directed to a method for identifying a faulty link in a multi-initiator topology. The method includes: monitoring occurrences of link disruptions independently by each initiator in the multi-initiator topology; reporting a detection of a faulty link by a reporting initiator in the multi-initiator topology when the reporting initiator detects a predetermined number of link disruptions within a predetermined time period; identifying at least one peer initiator in the multi-initiator topology, wherein each of the at least one peer initiator shares at least one shared link with the reporting initiator; and executing a common diagnostic process on each of the at least one peer initiator and the reporting initiator to identify the faulty link in the multi-initiator topology.

An additional embodiment of the present disclosure is directed to a storage system. The storage system includes a plurality of target devices and at least one expander configured to communicatively couple a plurality of initiators to the plurality of target devices. Each initiator of the plurality of initiators monitors occurrences of link disruptions independently, wherein upon detecting occurrences of a predetermined number of link disruptions within a predetermined time period, a reporting initiator reports a detection of a faulty link in the multi-initiator topology and requests an arbitrator to identify at least one peer initiator in the multi-initiator topology that shares at least one shared link with the reporting initiator. This reporting initiator and its peer initiators then jointly execute a common diagnostic process to identify the faulty link in the multi-initiator topology.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 is a flow diagram illustrating a method for identifying peer initiators prior to executing a common diagnostic process; and FIG. 4 is a flow diagram illustrating the common diagnostic process for identifying the faulty link in the multi-initiator system.

DETAILED DESCRIPTION

Figure 1:
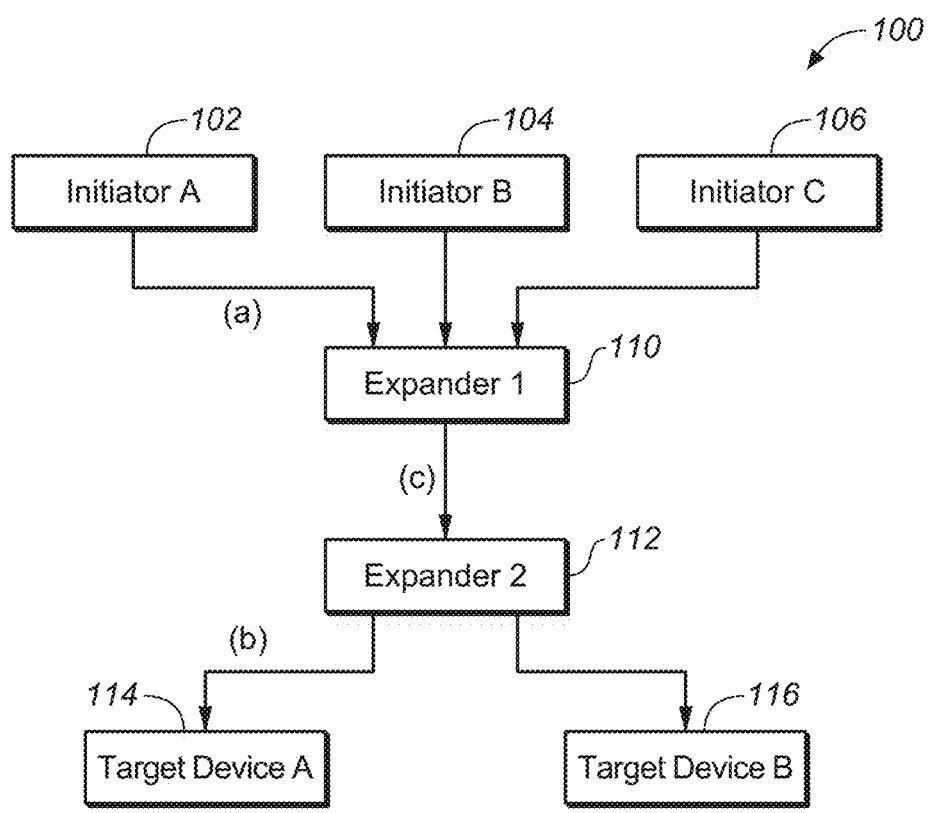
FIG. 1 is a block diagram depicting an exemplary multi-initiator system.

Reference will now be made in detail to the presently preferred embodiments of the invention, examples of which are illustrated in the accompanying drawings.

While SAS protocol provides for multiple initiators in a SAS domain, SATA is primarily designed for a single initiator environment. Extensions such as SATA affiliations allow for multi-initiators to communicate with a single SATA target, but protocol and error recoveries from events such as link disruptions or the like are still very difficult to handle.

Generally, most error recovery of transport, protocol or SATA target device requires issuing a link reset command (LINK RESET), which causes the device to abort all commands. Upon recognizing that a LINK RESET occurred, an initiator (unless it originated the LINK RESET) would then also issue a LINK RESET to ensure all its commands are aborted, before it can reissue its input/output (IOs) again. In a multi-initiator environment, suppose a first initiator issues a first LINK RESET and a second initiator, upon recognizing the first issued LINK RESET, issues a second LINK RESET at a later time, this second LINK RESET may abort the first initiator's newly reissued IOs and cause the first initiator to issue another (third) LINK RESET, when it detects the second LINK RESET. This process propagates a LINK RESET storm, disrupting the topology. The LINK RESET storm occurs because SATA protocol does not provide a way for an initiator to know which commands are active, thus it cannot infer, which commands were aborted, and therefore needs to issue a LINK RESET to abort all commands.

Algorithms such as that disclosed in co-pending and concurrently filed U.S. patent application entitled "Providing Multi-Initiator Serial Advanced Technology Attachment Support in a Multi-Initiator Environment" can be utilized to allow various initiators to co-operate gracefully to recover from errors. More specifically, a back-off period is established to conditionally force each initiator to hold its input/output (IO) commands. In one embodiment, all initiators in a multi-initiator system are configured to execute the same method to prevent LINK RESET propagation. That is, each initiator in the multi-initiator system is configured to utilize a predetermined back-off period to ensure that the link is stabilized before issuing any IOs. Utilizing such a back-off period reduces the chance of another initiator issuing a LINK RESET which would result in propagating a LINK RESET storm as described above. During the back-off period, which begins after each initiator issues its LINK RESET, that particular initiator does not issue any IOs, or LINK RESETs, in response to any detected phy change count updates and/or detected LINK RESETs issued by other initiators. Once the back-off period expires, that particular initiator can then safely reissue its IOs, after performing any required initialization functions.

While the algorithms such as that described above can help the system overcome link disruption caused by LINK RESET commands and/or changes to the topology (e.g., hot-plug of a device, a cable or the like), they are not designed to resolve situations when one or more links in the topology is faulty. For example, if a faulty link exists in the topology, the initiators that utilize such a faulty link will restart error recovery when error occurs, and continues to do so (e.g., keep issuing LINK RESETs) to disrupt the link. In such situations, the faulty link needs to be identified, and the corresponding initiator or device will need to be disabled, till the faulty link can be fixed.

Embodiments of the present disclosure are directed to fault detection and identification in a multi-initiator system. Referring to FIG. 1, a block diagram of an exemplary multi-initiator system 100 supporting three initiators (Initiator A 102, Initiator B 104 and Initiator C 106) is shown. The initiators are connected to various target devices 114 and 116 via expanders 110 and 112. In one embodiment, the multi-initiator system 100 implements multi-initiator SATA support in a multi-initiator SAS environment, wherein the expanders 110 and 112 are utilized to provide support and management of SATA affiliations, and the SATA initiators are allowed to simultaneously and actively access one or more shared SATA targets. The initiators are also allowed to communicate with each other via the expanders (via expander 110 in the example shown in FIG. 1).

Figure 2:
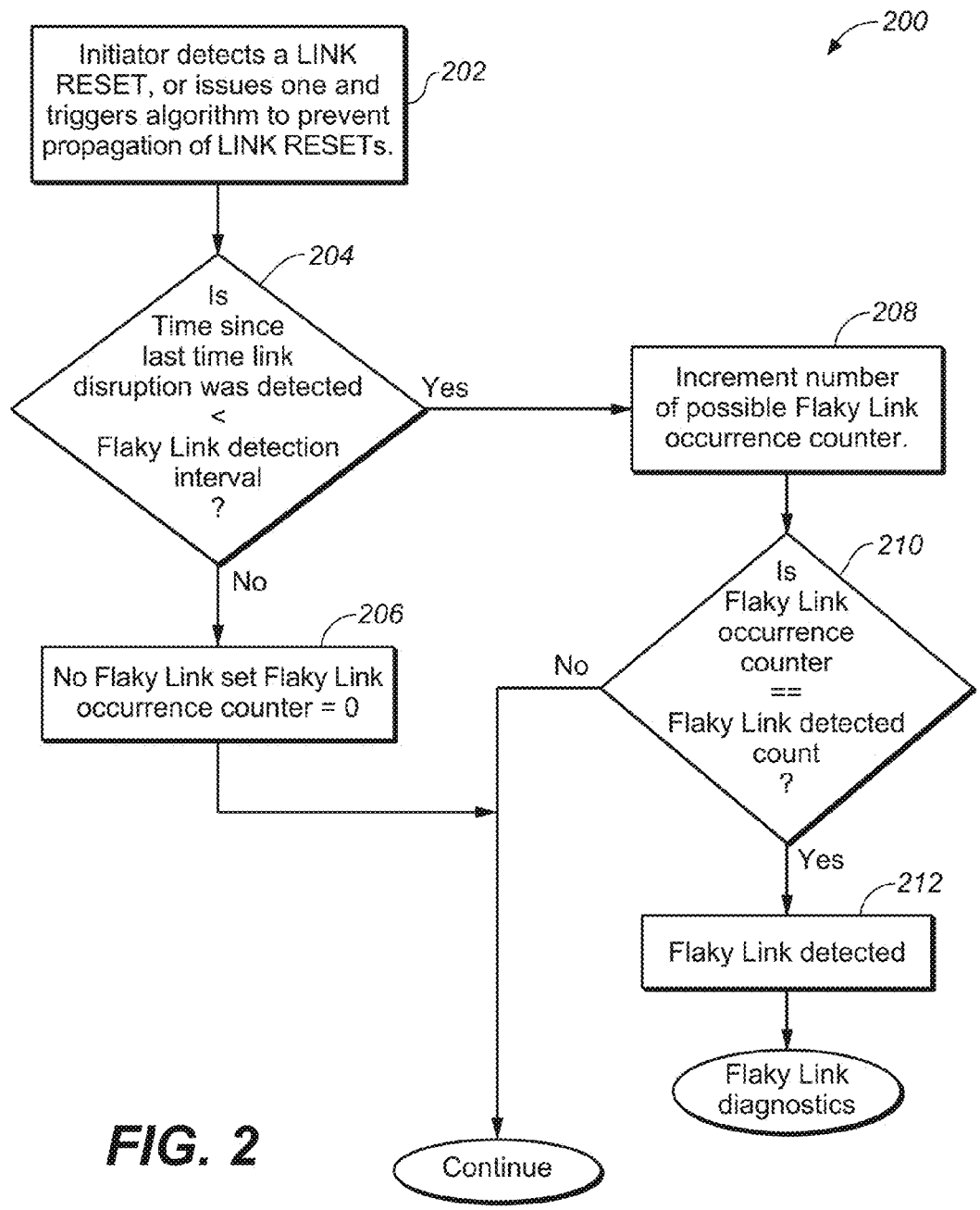
FIG. 2 is a flow diagram illustrating a method for detecting a faulty link in a multi-initiator system.

FIG. 2 shows a flow diagram illustrating a method 200 for detecting a faulty link in such a multi-initiator system. In accordance with method 200, if an initiator detects that the LINK RESETs continue to occur, and the algorithm for preventing the propagation of these LINK RESETs is invoked a certain number of times within a certain time period, e.g., N link disruptions within T time period, a faulty situation is assumed to exist.

More specifically, as depicted in step 202, whenever an initiator (e.g., initiator 102 for illustrative purposes) issues a LINK RESET or detects a LINK RESET issued by another initiator in the multi-initiator system, initiator 102 is required to invoke the algorithm utilized to prevent propagation of LINK RESETs (e.g., forced back-off period as an exemplary prevention algorithm). A determination is then made in step 204 based on how soon this prevention algorithm is invoked again. For instance, if more than a predetermined amount of time has passed since the last time the prevention algorithm was invoked, no faulty link is assumed to exist and the disruption counter is reset to 0 in step 206. On the other hand, if the prevention algorithm is invoked too soon (i.e., within the predetermined amount of time since the last time the prevention algorithm was invoked), further processing is needed in order to determine whether a faulty link situation indeed exist.

As depicted in step 208, when an initiator invokes the prevention algorithm within the predetermined amount of time since the last time the prevention algorithm was invoked, that initiator needs to increase its disruption counter by 1. An additional determination is made subsequently in step 210 by comparing this counter to a predetermined threshold. As long as the disruption counter is still within the threshold limit, no faulty link is assumed to exist and the disruption counter keeps its value. However, once the threshold limit is reached, a faulty link is assumed to exist and the detection result is reported in step 212.

Now, once a faulty link is reported, a diagnostic process needs to be invoked in order to identify which link is faulty. It is contemplated that three types of faulty links may exist. More specifically, type a) faulty link exists between an initiator and an expander/switch, and therefore will only directly affect one initiator, but the LINK RESET command issued by this initiator disrupts all its peers. Type b) faulty link exists between an expander and a target, and therefore will affect all initiators. Finally, type c) faulty link refers to some common link between expanders, also affecting all initiators.

In accordance with embodiments of the present disclosure, multiple initiators are configured to execute the same fault identification method (may also be referred to as the common diagnostic routine) jointly in order to identify the specific faulty link. As illustrated in FIG. 3, once a particular initiator reports detection of a faulty link in the topology (e.g., using method 200) in step 302, that particular reporting initiator shall request an arbitrator to identify/determine its peer initiator(s) in step 304. This reporting initiator and its identified peer initiator(s) shall then jointly execute the fault identification method as indicated in step 306.

The term peer initiator(s) refers to a set/subset of initiators in the topology that share some common links with the reporting initiator. In the exemplary topology shown in FIG. 1, all three initiators share some common links and initiators 104 and 106 are peers of the reporting initiator 102. It is contemplated, however, that in more complex topologies, certain initiators may not necessarily have to share any common links with the initiator that reported the fault (this initiator may be referred to as the reporting initiator), in which case these initiators may be excluded from the reporting initiator's peer group. It is also contemplated that various algorithms can be utilized to help identifying the peer initiator(s) for a reporting initiator. Furthermore, the arbitrator utilized to execute the peer-identification algorithm can be a standalone processor that is in communication with each initiator in the topology, or it can be hosted on a designated initiator in the topology.

Once the reporting initiator and its peers have been identified, the reporting initiator and its peers jointly execute the common diagnostic routine to identify the faulty link. Referring to FIG. 4, a flow diagram illustrating the common diagnostic routine 400 is shown. As depicted in FIG. 4, multiple initiators (i.e., the reporting initiator and its peers) each issues read and write requests in step 402 to scratch buffers on multiple targets. It is noted that under the common diagnostic routine, these initiators will not initiate error recovery (e.g., issuing LINK RESETs). A determination is then made in step 404 based on whether the errors occur only on one target or on multiple targets. If the errors occur only on one particular target, the faulty link is identified at that particular target in step 406. Such a faulty link is illustrated in the exemplary topology as link (b), which is a type b) faulty link as defined above that exists between an expander and a target.

On the other hand, if the errors occur on multiple targets, a further determination is made in step 408 based on whether the errors are identified by only one initiator or by multiple initiators. If the errors are identified by only one initiator, the faulty link is identified in step 410 at the link local to the initiator that identified the errors. Such a faulty link is illustrated in the exemplary topology as link (a), which is a type a) faulty link as defined above that exists between an initiator and an expander/switch. Finally, if the errors are identified by multiple initiators, the faulty link is identified at a link common to the multiple initiators. Such a common link is illustrated in the exemplary topology as link (c), which is identified as a type c) faulty link in step 412.

It is contemplated that various actions can be taken to resolve the faulty link once the faulty link is identified. For instance, the initiator(s) and/or device(s) associated with an identified faulty link can be temporarily disabled in order to isolate the faulty link until the issue is fixed. It is also contemplated that other actions may also be taken without departing from the spirit and scope of the present disclosure.

It is further contemplated that the fault detection and identification methods disclosed in the present disclosure are not limited to multi-initiator systems that provide multi-initiator SATA support. The fault detection and identification methods disclosed in the present disclosure are applicable to various other serial topologies such as SAS and the like. For instance, in a SAS topology, if the faulty link is local to an initiator, it may not be able to communicate with its peers as well. In such cases, each initiator may be configured to provide a scratch area for its peers to issue read and write requests to test the link. It is contemplated, however, that the methods depicted in FIGS. 2 through 3 remains the same and is equally effective in such topologies.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for identifying a faulty link in a multi-initiator topology, the method comprising:
   reporting a detection of a faulty link by a reporting initiator in the multi-initiator topology;
   identifying at least one peer initiator in the multi-initiator topology, wherein each of the at least one peer initiator shares at least one shared link with the reporting initiator; and
   executing a common diagnostic process on each of the at least one peer initiator and the reporting initiator, wherein the common diagnostic process includes the steps of:
      issuing at least one read request and at least one write request to every target device accessible to each initiator executing the common diagnostic process;
      determining whether errors occurred on more than one target device;
      identifying a link associated with a particular target device as the faulty link when errors occurred only on that particular target device;
      further determining whether errors are identified only by the reporting initiator when errors occurred on more than one target device;
      identifying a link associated with the reporting initiator as the faulty link when errors are identified only by the reporting initiator; and
      identifying said at least one shared link as the faulty link when errors are identified by the reporting initiator and the at least one peer initiator.

2. The method of claim 1, wherein the initiators in the multi-initiator topology are prevented from issuing any link reset command while executing the common diagnostic process.

3. The method of claim 1, wherein each initiator in the multi-initiator topology monitors occurrences of link disruptions independently.

4. The method of claim 3, wherein when a particular initiator in the multi-initiator topology detects a predetermined number of link disruptions within a predetermined time period, said particular initiator reports the detection of a faulty link in the multi-initiator topology.

5. The method of claim 1, wherein one initiator in the multi-initiator topology is designated as an arbitrator for identifying said at least one peer initiator in the multi-initiator topology when the detection of a faulty link is reported.

6. The method of claim 1, wherein the multi-initiator topology is a Serial Attached Small Computer System Interface (SAS) topology.

7. The method of claim 6, wherein each initiator in the multi-initiator topology is a Serial Advanced Technology Attachment (SATA) initiator.

8. The method of claim 7, wherein each initiator in the multi-initiator topology is communicatively coupled to at least one SATA target via at least one expander, wherein the at least one expander is utilized to provide a proxy to manage SATA affiliations for said initiator.

9. A method for identifying a faulty link in a multi-initiator topology, the method comprising:
- monitoring occurrences of link disruptions independently by each initiator in the multi-initiator topology;
- reporting a detection of a faulty link by a reporting initiator in the multi-initiator topology when the reporting initiator detects a predetermined number of link disruptions within a predetermined time period;
- requesting an arbitrator to identify at least one peer initiator in the multi-initiator topology, wherein each of the at least one peer initiator shares at least one shared link with the reporting initiator; and
- executing a common diagnostic process on each of the at least one peer initiator and the reporting initiator to identify the faulty link in the multi-initiator topology.

10. The method of claim 9, wherein the common diagnostic process includes the steps of:
- issuing at least one read request and at least one write request to every target device accessible to each initiator executing the common diagnostic process;
- determining whether errors occurred on more than one target device;
- identifying a link associated with a particular target device as the faulty link when errors occurred only on that particular target device;
- further determining whether errors are identified only by the reporting initiator when errors occurred on more than one target device;
- identifying a link associated with the reporting initiator as the faulty link when errors are identified only by the reporting initiator; and
- identifying said at least one shared link as the faulty link when errors are identified by the reporting initiator and the at least one peer initiator.

11. The method of claim 9, wherein the initiators in the multi-initiator topology are prevented from issuing any link reset command while executing the common diagnostic process.

12. The method of claim 9, wherein one initiator in the multi-initiator topology is designated as the arbitrator for identifying said at least one peer initiator in the multi-initiator topology when the detection of a faulty link is reported.

13. The method of claim 9, wherein the multi-initiator topology is a Serial Attached Small Computer System Interface (SAS) topology.

14. The method of claim 13, wherein each initiator in the multi-initiator topology is a Serial Advanced Technology Attachment (SATA) initiator.

15. The method of claim 14, wherein each initiator in the multi-initiator topology is communicatively coupled to at least one SATA target via at least one expander, wherein the at least one expander is utilized to provide a proxy to manage SATA affiliations for said initiator.

16. A storage system, comprising:
- a plurality of target devices; and
- at least one expander configured to communicatively couple a plurality of initiators to the plurality of target devices,
- wherein each initiator of the plurality of initiators monitors occurrences of link disruptions independently,
- wherein upon detecting occurrences of a predetermined number of link disruptions within a predetermined time period, a reporting initiator reports a detection of a faulty link in the multi-initiator topology and requests an arbitrator to identify at least one peer initiator in the multi-initiator topology that shares at least one shared link with the reporting initiator, and
- wherein the at least one peer initiator and the reporting initiator are configured to jointly execute a common diagnostic process to identify the faulty link in the multi-initiator topology.

17. The storage system of claim 16, wherein the common diagnostic process includes:
- issue at least one read request and at least one write request to every target device accessible to the at least one peer initiator and the reporting initiator;
- determine whether errors occurred on more than one target device;
- identify a link associated with a particular target device as the faulty link when errors occurred only on that particular target device;
- further determine whether errors are identified only by the reporting initiator when errors occurred on more than one target device;
- identify a link associated with the reporting initiator as the faulty link when errors are identified only by the reporting initiator; and
- identify said at least one shared link as the faulty link when errors are identified by the reporting initiator and the at least one peer initiator.

18. The storage system of claim 16, wherein a link reset command is disabled while the at least one peer initiator and the reporting initiator jointly execute the commor diagnostic process.

19. The storage system of claim 16, wherein one initiator of the plurality of initiators is designated as the arbitrator.

20. The storage system of claim 16, wherein the storage system implements a multi-initiator Serial Attached Small Computer System Interface (SAS) topology and each initiator of the plurality of initiators is a Serial Advanced Technology Attachment (SATA) initiator.

* * * * *